United States Patent [19]

Schuster

[11] Patent Number: 5,065,616

[45] Date of Patent: Nov. 19, 1991

[54] HYDROSTATIC LINE TESTING AND METHOD

[76] Inventor: Peter Schuster, 211 E. Grove, Kawkawlin, Mich. 48631

[21] Appl. No.: 442,072

[22] Filed: Nov. 28, 1989

Related U.S. Application Data

[63] Continuation-in-part of Ser. No. 345,688, May 1, 1989, Pat. No. 4,945,757.

[51] Int. Cl.$^5$ .............................................. G01F 23/14
[52] U.S. Cl. ........................................ 73/49.2; 73/40; 340/605
[58] Field of Search .................. 73/40, 49.2 T, 49.2 R; 340/605

[56] References Cited

U.S. PATENT DOCUMENTS

| | | | |
|---|---|---|---|
| 1,783,412 | 12/1930 | Crowe | 73/37 |
| 2,353,275 | 7/1944 | St. Clair | 73/37 |
| 2,539,843 | 1/1951 | Kerr | 73/37 |
| 3,910,102 | 5/1974 | McLean | 73/49.2 R |
| 4,571,987 | 2/1986 | Horner | 73/49.2 T |
| 4,796,469 | 1/1989 | Brown et al. | 73/49.2 T |
| 4,945,757 | 8/1990 | Schuster | 73/49.2 T |

*Primary Examiner*—Tom Noland
*Assistant Examiner*—W. Francos
*Attorney, Agent, or Firm*—John J. Swartz

[57] ABSTRACT

Apparatus for, and method of, hydrostatically testing whether a line filled with a liquid, such as gasoline, is leaking comprising mechanism for closing one end of the line to be tested and an upstanding cylinder having its upper end coupled to the opposite end of the line to be tested. The cylinder is transparent and filled at its upper end with a liquid identical to the liquid in the line being tested and at its lower end, a second liquid of a substantially heavier density so that the liquids do not mix. Mechanism is provided for applying pressure to the heavier density liquid to force the liquid in the upper end of the cylinder into the line. The cylinder is transparent and includes graduations thereon so that the user can visualize whether or not the junction is moving.

9 Claims, 2 Drawing Sheets

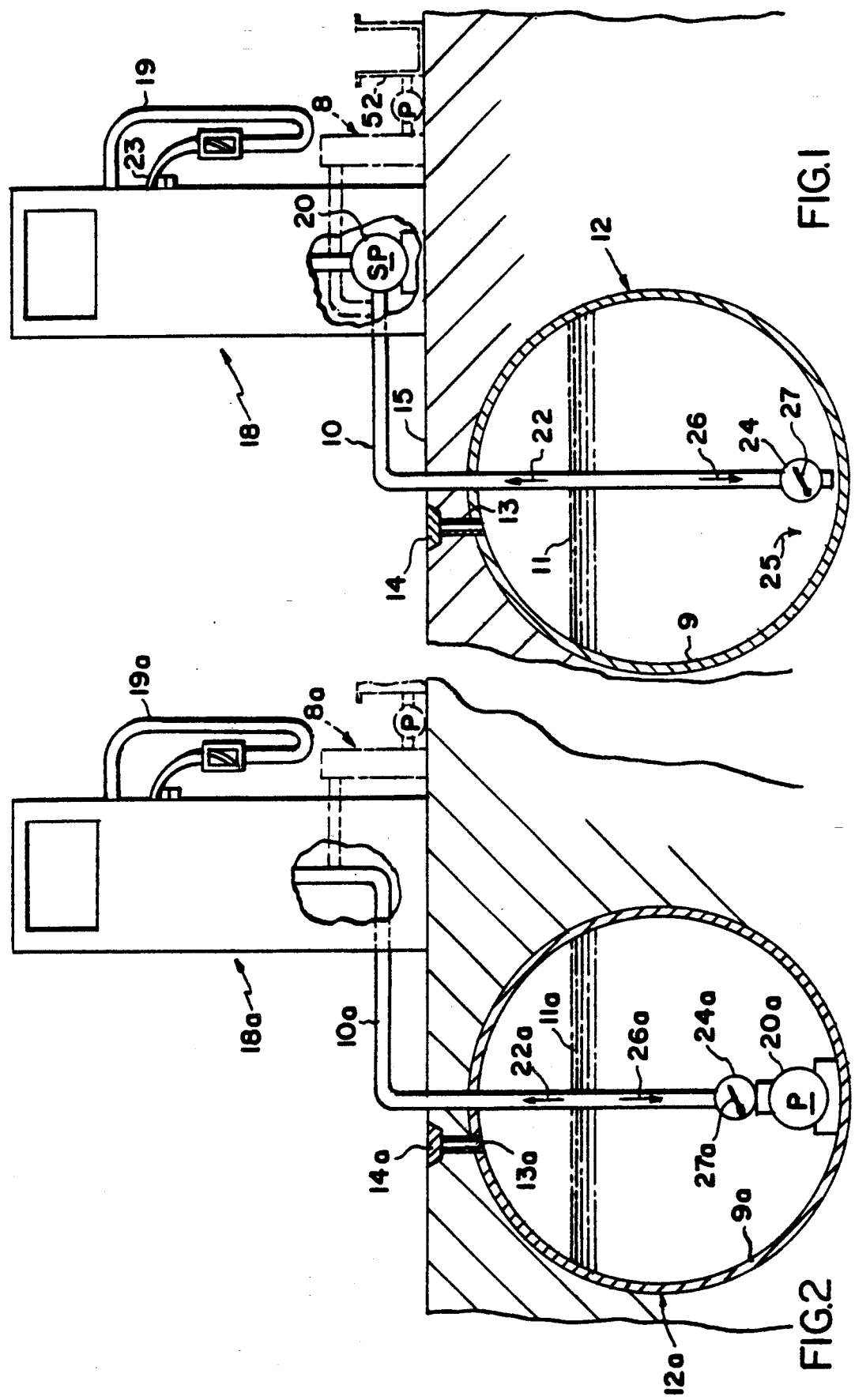

HYDROSTATIC LINE TESTING AND METHOD

This application is a continuation-in-part of pending patent application, Ser. No. 345,688, now U.S. Pat. No. 4,945,757 filed in the U.S. Patent Office on or about May 1, 1989 entitled Constant Leak Level Detection Apparatus and Method, which application is fully incorporated herein by reference as though recited word-for-word herein.

BACKGROUND OF THE INVENTION

1. Field of the Invention

This invention relates to a hydrostatic line tester and method of testing a fluid filled line for leaks and more particularly to apparatus for testing whether a pipe filled with a volatile liquid, such as gasoline, is leaking.

2. Objects and Description of the Prior Art

The apparatus disclosed in the aforementioned patent application is particularly adapted to testing whether an underground liquid filled storage tank, such as that typically found in a retail gasoline station, is leaking. The apparatus disclosed therein includes a constant level leak detector which applies a substantially constant head to a gasoline filled tank throughout the test.

As recited in the aforementioned prior art application, serious environmental problems are occasioned if an underground fuel tank leaks. Environmental protection agencies set forth the standard for maximum leakage allowable in fuel tanks.

Although the tanks can be a major source of underground contamination, the pipes leading to the tanks for drawing out the liquid gasoline to the above ground dispensers must also be substantially leak free. Obviously, if there is a leak in a pipe which transfers fuel to or from the tank, this could pose a substantial environmental hazard to water supply systems and the like.

Accordingly, it is an object of the present invention to provide a new and novel line tester for testing whether or not fuel filled lines leading to such fuel tanks are leaking.

Another object of the present invention is to provide new and novel hydrostatic line testing apparatus and method of leak testing a fluid filled line.

As recited in the aforementioned patent application, some prior art leak detectors have utilized a pressurized gas for maintaining force on the liquid in the vessel being tested. The use of such gas is potentially hazardous, particularly if the liquid in the vessel being tested is volatile, such as gasoline. It is another object of the present invention to provide a new and novel line tester which is safer than other prior art line testers which utilize a gas under pressure for maintaining pressure on liquid in the liquid filled line being tested.

A further object of the present invention to provide hydrostatic line testing apparatus which utilizes liquid instead of a gas for maintaining pressure on the liquid in a line being leak tested.

It is a still further object of the present invention to provide hydrostatic line testing apparatus which utilizes a liquid, having a different density than the liquid in the line being tested, under pressure for maintaining pressure on the liquid in the line being leak tested.

Yet another object of the present invention is to provide line testing apparatus of the type described which utilizes a pressurizing liquid, having a density heavier than the density of the liquid in the line being tested, for maintaining pressure on the liquid in the line.

Various leak detectors such as that disclosed in U.S. Pat. No. 4,907,464 issued to Lewis J. Janotta on Feb. 28, 1989, include various gages, measuring devices and data collector and processors for providing a readout of volumetric changes. Such systems are relatively complicated and expensive. Accordingly, it is an object of the present invention to provide new and novel leak testing apparatus which is easier and less expensive to build than the competing prior art test apparatus.

Still another object of the present invention to provide new and novel line test apparatus of the type described which includes a graduated cylinder for providing a visual indication of volumetric changes of the liquid in the line being tested.

It is another object of the present invention to provide new and novel method and apparatus for testing whether a fuel supply line which leads to an underground fuel storage tank is leaking including apparatus for isolating the fuel filled supply lines from the fuel tank.

Other objects and advantages of the present invention will become apparent to those of ordinary skill in the art as the description thereof proceeds.

SUMMARY OF THE INVENTION

Apparatus for testing whether a pipe filled with a liquid having a first predetermined density is leaking comprising mechanism coupled to the pipe for applying pressure to the liquid in the pipe including an upstanding cylinder partially filled at one end with liquid identical to the liquid in the pipe being tested; mechanism for coupling the one end of the cylinder to the pipe being tested; mechanism for admitting a second liquid having a second predetermined density to the cylinder under pressure to the opposite end of the cylinder to force the liquid in the one end of the cylinder into the pipe; and graduations on the cylinder for providing a visual indication of any volumetric changes of the liquid in the line being tested.

BRIEF DESCRIPTION OF THE DRAWINGS

The invention may be more readily understood by referring to the accompanying drawings, in which:

FIG. 1 is a sectional front view illustrating an underground fuel storage tank coupled to an above ground fuel dispenser and schematically illustrating the apparatus constructed according to the present invention;

FIG. 2 is a view substantially similar to figure one illustrating a slightly modified fuel tank construction incorporating apparatus constructed according to the present invention.

DESCRIPTION OF THE PREFERRED EMBODIMENT

Figure 3:
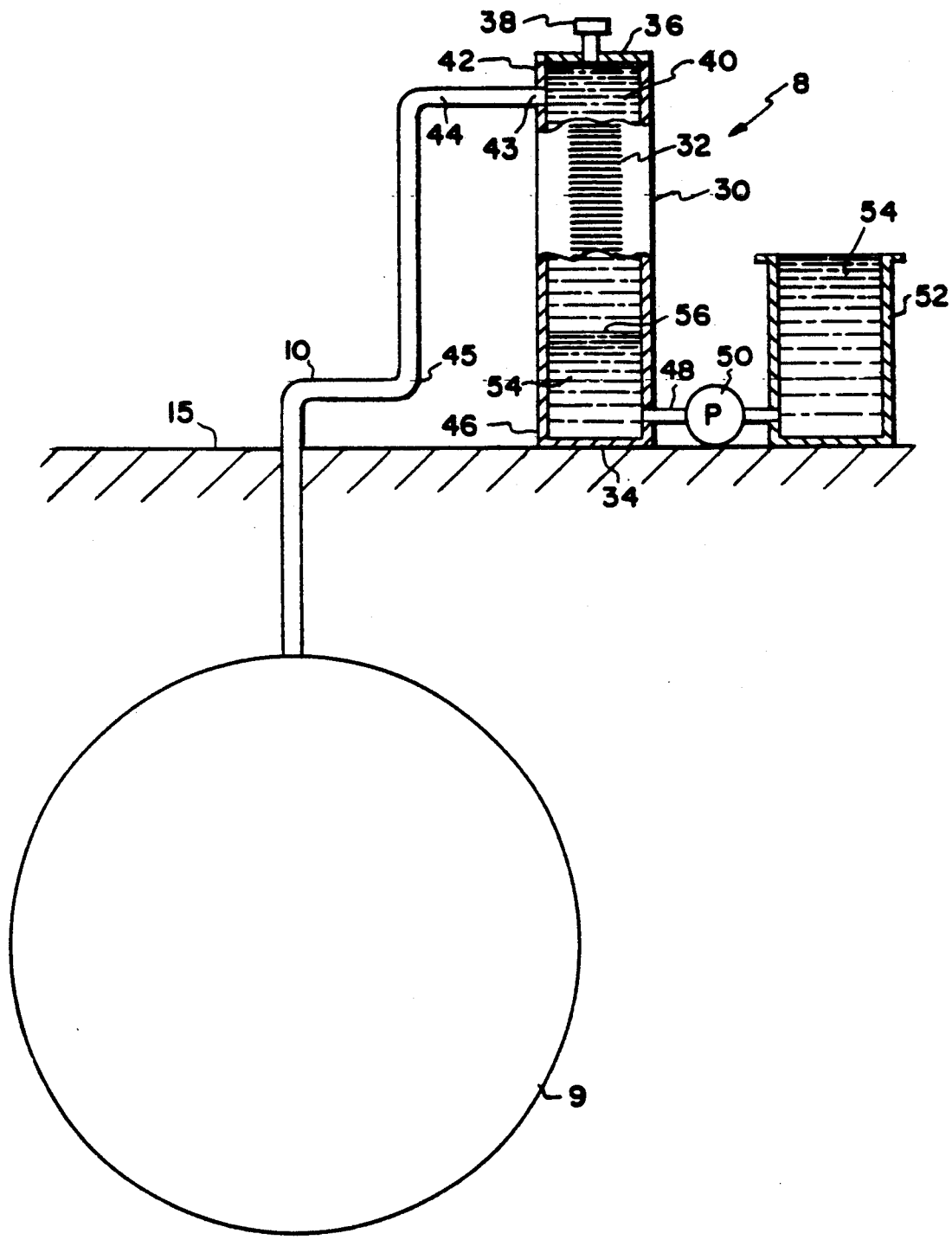
FIG. 3 is a greatly enlarged sectional front view more particularly illustrating apparatus constructed according to the present invention utilized to test the fuel supply line leading to an underground storage tank such as that illustrated in FIGS. 1 and 2.

Apparatus, generally designated 8, constructed according to the present invention is particularly adapted for use in leak testing an underground pipe or conduit 10 which draws a volatile or easily ignitable liquid, such as gasoline 11, from an underground fuel storage tank generally designated 12. The fuel storage tank 12 typically comprises a hollow cylindrical cylinder 9 closed at opposite ends and filled completely with gasoline 11 via a fuel supply line 13 which leads to the ground surface 15 and is closed by a cap 14. The line 10 is normally coupled at its opposite end to a standard fuel supply pump dispenser 18 such as that typically found in gasoline service stations. The dispenser 18 utilizes a conventional fuel dispensing hose 19 and nozzle 23 which is manually inserted into an automobile fuel tank, as usual.

The fuel dispenser 18 includes a suction type pump 20 which is coupled to the upper end of pipe 10 for drawing liquid upwardly in the pipe 10 in the direction of the arrow 22. As illustrated, the pipe or conduit 10 extends to the bottom of the tank 12. The lower end of the line 10 is coupled to a "one-way" foot valve 24 which includes a valve plate, schematically designated 27, which will swing upwardly and allow the pump 20 to upwardly draw fuel 11 in the tank 9 through pipe 10 in the direction of the arrow 22 when the pump 20 is operated. Likewisely, the valve plate 27 will swing downwardly, in the direction of the arrow 25, to close or isolate the lower end of the pipe 10 from the tank 9 when reverse pressure is applied in the direction of arrow 26 to prevent the reverse flow of liquid from the pipe 10 to the tank 12.

When it is desired to test whether or not the pipe 10 is leaking, the suction pump 20 is disconnected from the upper end of line 10 and the test apparatus, schematically illustrated at 8 in chain lines in FIG. 1, is coupled to the upper end of the pipe 10.

The apparatus illustrated in FIG. 2 is generally similar to that illustrated in FIG. 1 and substantially identical parts will be identified by substantially identical reference characters followed by the letter a subscript. The apparatus illustrated in FIG. 2, rather than including an external suction pump 20, includes a submerged pump 20a disposed inside the tank 9a. The pump 20a is coupled to the lower end of the valve 24a which will allow liquid to be pumped upwardly in the direction of the arrow 22a but will preclude the reverse flow of liquid in the direction represented by the arrow 26a as previously described.

THE HYDROSTATIC TEST APPARATUS

The test apparatus 8 constructed according to the present invention is more particularly illustrated in FIG. 3 and includes a clear or translucent, upstanding, ground supported hollow cylinder 30 having a plurality of vertically spaced graduations 32 thereon for providing a visual indication to the operator of any leak in a manner which will be more particularly described hereinafter.

The cylinder 30 is closed at opposite ends via lower and upper end walls 34 and 36, respectively. The upper end wall 36 includes a normally closed fuel inlet valve 38 which can be opened to receive fuel 40 identical to the fuel in the line 10 being tested. The upper end 42 of the cylinder 30 is coupled to one end 43 of a line 44 which is coupled at its opposite end 45 to the portion of the line 10 which was disconnected from the suction pump 20. The lower end 46 of the translucent cylinder 30 is coupled to a pump 50 and a water reservoir 52 via a line 48 for pumping water 54 from the reservoir 52 to the lower end 46 of the cylinder 30. The water 54 pumped into the lower end of the cylinder 30 will have a substantially heavier density than the density of the fuel 40 in the upper end of the cylinder 30 so that the two liquids 40 and 54 are in intimate contact at junction 56, and the two fuels substantially do not mix but are separated at the junction 56.

THE OPERATION

With the apparatus configured as illustrated in FIG. 1, the suction pump 20 is decoupled from the upper end of the fuel filled pipe 10 and the lower end 45 of the pipe 44 is coupled to the upper end of the pipe 10. Gasoline or other petroleum identical to the petroleum in the line 10 is supplied through valve 38 to partially fill the cylinder 30 approximately ¾ full.

The pump 50 which is coupled to the water reservoir 52 is operated to supply water 54 to the lower end of the cylinder 30 to slowly fill the remaining volume of the cylinder 30. When the cylinder 30 is full, the top valve 38 is closed and the pump 50 is operated to greatly increase the pressure on the water 54. This pressure will force the liquid 40 upwardly to place the fuel 40 in intimate contact with the fuel in the line 10. This will force the foot valve 24 to close and isolate the bottom end of the line 14 from the underground tank 12 so that no additional fuel can flow in the direction of the arrow 26. The pump will continue to operate until the junction 56 stabilizes. The operation of pump 50 will be adjusted so that approximately 50 lbs. per square inch of pressure is exerted on the water 54. If there is no leak in the pipe 10, the junction 56 will not move and will remain constant.

If there is a leak in the pipe 14, the fuel 40 will be forced upwardly into the pipe 44 and thence into the pipe 10 and thus the junction 56 as well as water 54 will move upwardly so that the junction 56 can be visually observed to move upwardly. Accordingly, the user can quickly and easily tell whether or not a leak has occurred. Additional water will be supplied to the lower end 54 of the cylinder.

The separation of graduations is calibrated such that 0.003 gallons of fuel is disbursed as the junction 56 moves between each adjacent pair of graduations. Accordingly, the user can quickly tell the rate at which the pipe 10 is leaking to determine whether or not it is within an acceptable level.

In the operation of the system in connection with FIG. 2, the operation is substantially identical except that there would be no need to disconnect the pump 20a. Instead, the upper end of the pipe 10a would be decoupled from the pump 18a and the tester 8a coupled to the upper end of a pipe 10a. The identical test would then be repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for testing whether a pipe which is closed at one end and filled with a first liquid, such as gasoline, having a first predetermined density is leaking comprising:
    means coupled to the opposite end, opposite said one end, of said pipe for applying pressure to said first liquid in said pipe comprising
        an upstanding cylinder containing a second liquid having a density equal to said first predetermined density of said first liquid;
        means for coupling one end of said cylinder to said opposite end of said pipe so that the liquid in said cylinder is in intimate fluid contact with said first liquid in said pipe to be tested;

means for admitting a third liquid to the opposite end of said cylinder;

said third liquid having a density substantially different than said first predetermined density such that said second and third liquids, although in intimate contact with each other at a junction in said cylinder, remain substantially separated at said junction and substantially do not mix;

means for applying a predetermined pressure to said third liquid in said cylinder in a direction tending to force said second and third liquids in said cylinder toward said first liquid in said pipe; and graduation means on said cylinder for providing a visual indication whether said junction of said second and third liquids in said cylinder moves toward said first end or said second end of said cylinder and thus indicate volumetric changes of the first liquid in said pipe being tested.

2. The apparatus set forth in claim 1 wherein said cylinder is upstanding.

3. The apparatus set forth in claim 2 wherein said means for coupling said one end of said cylinder includes means for coupling the upper end of said cylinder to said pipe to be tested and said means for admitting a third liquid to said opposite end of said cylinder includes means coupled to said lower end of said cylinder.

4. The apparatus set forth in claim 3 wherein said means for admitting a third liquid includes means for admitting liquid having a density which is heavier than said first predetermined density.

5. The apparatus set forth in claim 4 wherein said third liquid comprises water.

6. The apparatus set forth in claim 1 wherein said cylinder comprises transparent material which allows the junction of said second and third liquids inside said cylinder to be viewed from outside said cylinder; said graduation means comprising a plurality of vertically spaced graduations on said transparent material.

7. Apparatus for testing whether a hollow cylindrical conduit, filled with ignitable liquid such as gasoline having a predetermined density, is leaking comprising:

upstanding cylinder means filled with a first liquid, substantially identical to said ignitable liquid, at its upper end and a second liquid at its lower end;

said second liquid having a heavier predetermined density so that said first and second liquids, although in intimate contact with each other at the junction thereof, remain substantially separated;

means for sealing one end of said conduit line to be tested;

means for coupling said upper end of said cylinder means to said opposite end of said conduit to be tested so that said first liquid in said cylinder and said liquid in said conduit are in intimate fluid contact;

means for applying a predetermined above atmospheric pressure to said second liquid in said cylinder tending to force said first liquid into said conduit to be tested; and graduation means on said cylinder at the level of said junction of said first and second liquids in said cylinder for providing a visual indication of whether the level of said junction is vertically moving and thus indicate any volumetric changes of the fuel in the conduit being tested.

8. The apparatus set forth in claim 7 wherein said second liquid comprises water.

9. A method of testing whether a hollow cylindrical conduit, which transfers liquid, such as gasoline, of a predetermined density, from an underground storage tank is leaking, comprising:

isolating a downstream end of said conduit to be tested from said underground storage tank;

communicating a first liquid, substantially identical to the liquid in the conduit being tested, to one end of said conduit being tested via one end of a graduated cylinder;

communicating a second liquid, having a second predetermined density which is substantially different than said predetermined density, to the opposite end of said graduated cylinder, so that said first and second liquids are separated at the boundary thereof;

applying an above atmospheric pressure to said second liquid tending to force said first liquid into said line to be tested; and visually determining volumetric changes of the liquid in the line being tested by visually determining whether the boundary of said first and second liquids moves along the length of said cylinder.

* * * * *